(12) United States Patent
Yoon et al.

(10) Patent No.: US 10,913,375 B2
(45) Date of Patent: Feb. 9, 2021

(54) APPARATUS AND METHOD FOR POWER DEMAND DISTRIBUTION IN FUEL CELL VEHICLE

(71) Applicants: Hyundai Motor Company, Seoul (KR); Kia Motors Corporation, Seoul (KR)

(72) Inventors: Sung Gone Yoon, Gyeonggi-do (KR); Seung Heon Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 260 days.

(21) Appl. No.: 15/997,970

(22) Filed: Jun. 5, 2018

(65) Prior Publication Data
US 2019/0160963 A1 May 30, 2019

(30) Foreign Application Priority Data

Nov. 27, 2017 (KR) .......................... 10-2017-0159179

(51) Int. Cl.
| | |
|---|---|
| *B60L 58/40* | (2019.01) |
| *B60W 10/26* | (2006.01) |
| *H01M 8/04992* | (2016.01) |
| *H01M 16/00* | (2006.01) |
| *B60L 53/22* | (2019.01) |

(Continued)

(52) U.S. Cl.
CPC .............. *B60L 58/40* (2019.02); *B60L 1/003* (2013.01); *B60L 15/20* (2013.01); *B60L 50/75* (2019.02); *B60L 53/22* (2019.02); *B60W 10/26* (2013.01); *H01M 8/04992* (2013.01); *H01M 16/006* (2013.01); *B60L 2210/12* (2013.01); *B60L 2240/12* (2013.01); *B60L 2240/421* (2013.01); *B60L 2240/423* (2013.01); *B60W 10/08* (2013.01); *B60W 10/12* (2013.01);

(Continued)

(58) Field of Classification Search
CPC ...................................................... B60L 58/40
See application file for complete search history.

(56) References Cited

U.S. PATENT DOCUMENTS 9,337,503 B2 * 5/2016 Lenz ................. H01M 8/04619
9,649,951 B2 5/2017 Gerard et al.
(Continued)

FOREIGN PATENT DOCUMENTS

| JP | 2008312418 A | 12/2008 |
|---|---|---|
| JP | 5412719 B2 | 2/2014 |
| KR | 20150066080 A | 6/2015 |

*Primary Examiner* — Michael A Berns
(74) *Attorney, Agent, or Firm* — Mintz Levin Cohn Ferris Glovsky and Popeo, P.C.; Peter F. Corless

(57) ABSTRACT

An apparatus for power demand distribution in a fuel cell vehicle includes: a battery management system calculating an allowable battery power that a battery can supply; a power demand distribution controller configured to derive a vehicle demand power including a drive motor demand power required by the drive motor, and determine a value corresponding to a vehicle demand power minus the allowable battery power being scaled down or the drive motor demand power, as a fuel cell demand output; and a fuel cell controller configured to drive the air compressor feeding the air to the fuel cell to enable a fuel cell to generate the fuel cell demand output calculated by the power demand distribution controller.

12 Claims, 8 Drawing Sheets

(51) Int. Cl.
*B60L 50/75* (2019.01)
*B60L 1/00* (2006.01)
*B60L 15/20* (2006.01)
*B60W 10/08* (2006.01)
*B60W 10/28* (2006.01)
*B60W 10/12* (2012.01)
*B60W 20/40* (2016.01)

(52) U.S. Cl.
CPC ............ *B60W 10/28* (2013.01); *B60W 20/40* (2013.01); *H01M 2250/20* (2013.01)

(56) References Cited

U.S. PATENT DOCUMENTS

| | | | |
|---|---|---|---|
| 9,884,567 B2 * | 2/2018 | Oda | B60L 15/20 |
| 10,000,140 B2 * | 6/2018 | Kang | B60L 11/1881 |
| 10,396,376 B2 * | 8/2019 | Setoguchi | H01M 8/04776 |
| 2009/0105895 A1 * | 4/2009 | Shige | B60L 15/2045 |
| | | | 701/22 |

* cited by examiner

APPARATUS AND METHOD FOR POWER DEMAND DISTRIBUTION IN FUEL CELL VEHICLE

CROSS REFERENCE TO RELATED APPLICATION

The present application claims under 35 U.S.C. § 119(a) the benefit of Korean Patent Application No. 10-2017-0159179, filed on Nov. 27, 2017, the entire contents of which are incorporated by reference herein.

BACKGROUND

(a) Technical Field

The present disclosure relates to an apparatus and method for power demand distribution in a fuel cell vehicle, more particularly, to an apparatus and method for power demand distribution that can enhance dynamic performance of the fuel cell vehicle by appropriately allocating through distribution, between a battery and a fuel cell, vehicle demand power required to drive the fuel cell vehicle or motor demand power required by a drive motor of the fuel cell vehicle.

(b) Description of the Related Art

Environmentally-friendly vehicles such as a hybrid vehicle, an electric vehicle, and a fuel cell vehicle (or a hydrogen vehicle) typically refer to vehicles driven by a motor rotating by using electric energy. Particularly, the fuel cell vehicle is equipped with a fuel cell producing electric energy and a battery storing electric energy therein, wherein the electric energy is supplied from the fuel cell and the battery to a drive motor.

At this time, electric energy supplied to the drive motor is determined as a sum of electric energy supplied from each of the fuel cell and the battery, and efficiency in a fuel cell vehicle can be maximized by appropriately distributing an amount of energy supplied from the fuel cell and the battery.

Usually, power is selectively supplied on the basis of an operational mode such that when vehicle demand power demanded by a vehicle is high, as in a case of rapid acceleration of the drive motor, the fuel cell and the battery supply power in parallel, and when the vehicle demand power is low, the vehicle is driven only by the fuel cell or the battery alone supplying the power by terminating the operation of the fuel cell.

In the case of the battery storing the electric energy as a power supply device, it is possible to supply power that the drive motor may need at any time. However, in the case of the fuel cell, it is difficult to immediately output the vehicle demand power, since hydrogen and air required for production of the power should be fed, and a chemical reaction between hydrogen and air must occur in order to produce electric energy. Particularly, in the case of air fed to the fuel cell, since air should be fed through an operation of a device such as a separate air compressor, a certain length of response time delay is inevitable to feed air corresponding to a targeted amount of air flow.

For a typical fuel cell vehicle, in a case in which a driver demands a rapid acceleration in a state when vehicle demand power is low (e.g., a vehicle in a stopped state, or in a low speed drive state), demand power is managed such that a high voltage battery preferentially supplies the power necessary for the drive motor, and the demand power exceeding allowable high voltage battery power is supplied from the fuel cell. As described earlier, in order to feed air at a feed flow rate needed for the fuel cell to be able to produce adequate power, air should be fed quickly through the air compressor when such a demand occurs. However, due to characteristics of hardware such as the air compressor, a limiting situation may occur wherein the feed flow rate of air cannot be established to adequately meet a demand corresponding to the demand power that the drive motor requires.

Even though the driver demands rapid acceleration by flooring the accelerator pedal, a time delay occurs in the process of feeding air from the air compressor, whereby the driver may have dissatisfaction with acceleration performance.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes an apparatus and method for power demand distribution in a fuel cell vehicle that is able to compensate for a delay of a fuel cell output due to an operation of an air compressor and to enhance dynamic performance of the fuel cell vehicle.

In order to achieve the above objective, according to one aspect of the present disclosure, there is provided an apparatus for power demand distribution in a fuel cell vehicle having a fuel cell, a battery, and a drive motor operating by power supplied from the fuel cell and the battery, the apparatus including: a battery management system calculating an allowable battery power that the battery can supply; a power demand distribution controller configured to derive a vehicle demand power including a drive motor demand power required by the drive motor, and determine a value obtained by subtracting the allowable battery power being scaled down from the vehicle demand power or a value corresponding to the drive motor demand power, as a fuel cell demand output; and a fuel cell controller configured to drive an air compressor feeding air to the fuel cell to enable the fuel cell to generate the fuel cell demand output calculated by the power demand distribution controller.

In an embodiment of the present disclosure, when the air compressor is in a stopped state, the power demand distribution controller may determine the value obtained by subtracting the allowable battery power being scaled down from the vehicle demand power, as the fuel cell demand output.

In an embodiment of the present disclosure, the power demand distribution controller may scale down the allowable battery power by multiplying a scaling factor gradually increasing as time passes by the allowable battery power.

In an embodiment of the present disclosure, when the air compressor is not in a stopped state, but in a low speed operating state with a speed lower than a predetermined reference revolution speed, the power demand distribution controller may determine the value corresponding to the drive motor demand power, as the fuel cell demand output.

In an embodiment of the present disclosure, when the air compressor is not in a stopped state, but in a low speed operating state with a speed lower than a predetermined reference revolution speed, the power demand distribution controller may determine a greater value between a value obtained by subtracting the allowable battery power from both the drive motor demand power and the vehicle demand power and the value of the drive motor demand power, as the fuel cell demand output.

In an embodiment of the present disclosure, the apparatus may further include an auxiliary machinery power consumption calculation unit calculating power consumed by an auxiliary machinery being supplied with power from the fuel cell or the battery, wherein the power demand distribution controller may calculate the vehicle demand power by adding the drive motor demand power and the power consumed by the auxiliary machinery.

In another aspect of the present disclosure, there is provided a method for power demand distribution in a fuel cell vehicle having a fuel cell, a battery, and a drive motor operating by power supplied from the fuel cell and the battery, the method including: deriving drive motor demand power required by the drive motor on the basis of a vehicle speed and an opening ratio of a vehicle accelerator; receiving allowable battery power that the battery can supply; confirming an operating status of an air compressor feeding air to the fuel cell; and determining, on the basis of the operating status of the air compressor, a value obtained by subtracting the allowable battery power being scaled down from the vehicle demand power including the drive motor demand power or a value corresponding to the drive motor demand power, as a fuel cell demand output.

In an embodiment of the present disclosure, at the confirming the operating status of the air compressor, it may be determined whether the air compressor is in a stopped state, and then when the air compressor is not in the stopped state, it may be determined whether the air compressor is in a low speed operating state with a speed lower than a predetermined reference revolution speed.

In an embodiment of the present disclosure, when the air compressor is confirmed being in the stopped state at the confirming the operating status of the air compressor, the value obtained by subtracting the allowable battery power being scaled down from the vehicle demand power including the drive motor demand power may be determined as the fuel cell demand output at the determining the fuel cell demand output.

In an embodiment of the present disclosure, when the air compressor is confirmed being in the stopped state at the confirming the operating status of the air compressor, the allowable battery power may be scaled down by multiplying a scaling factor gradually increasing as time passes by the allowable battery power at the determining the fuel cell demand output.

In an embodiment of the present disclosure, when the air compressor is confirmed being in the low speed operating state with the speed lower than the predetermined reference revolution speed at the confirming the operating status of the air compressor, the value corresponding to the drive motor demand power may be determined as the fuel cell demand output at the determining the fuel cell demand output.

In an embodiment of the present disclosure, when the air compressor is confirmed being in the low speed operating state with the speed lower than the predetermined reference revolution speed at the confirming the operating status of the air compressor, a greater value between a value obtained by subtracting the allowable battery power from both the drive motor demand power and the vehicle demand power and the value of the drive motor demand power may be determined as the fuel cell demand output at the determining the fuel cell demand output.

In an embodiment of the present disclosure, the method may further include: driving the fuel cell by feeding hydrogen and air to the fuel cell on the basis of the fuel cell demand output, subsequent to the determining the fuel cell demand output; deriving an allowable fuel cell power that can be output from the fuel cell, subsequent to the driving the fuel cell; and deriving an allowable drive motor power that can be provided to the drive motor on the basis of the allowable battery power and the allowable fuel cell power, and determining a final driving torque of the drive motor on the basis of the allowable drive motor power.

According to the apparatus and method for power demand distribution in the fuel cell vehicle of the present disclosure, by advancing an operating time of the air compressor feeding air to the fuel cell by appropriately adjusting the fuel cell demand power, the power is efficiently supplied from the fuel cell without time delay at a time when drive motor demand power exceeds the power of the battery. Accordingly, the present disclosure can realize a drive motor torque corresponding to a driver demand torque, thereby preventing degradation in the dynamic performance of the duel cell vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
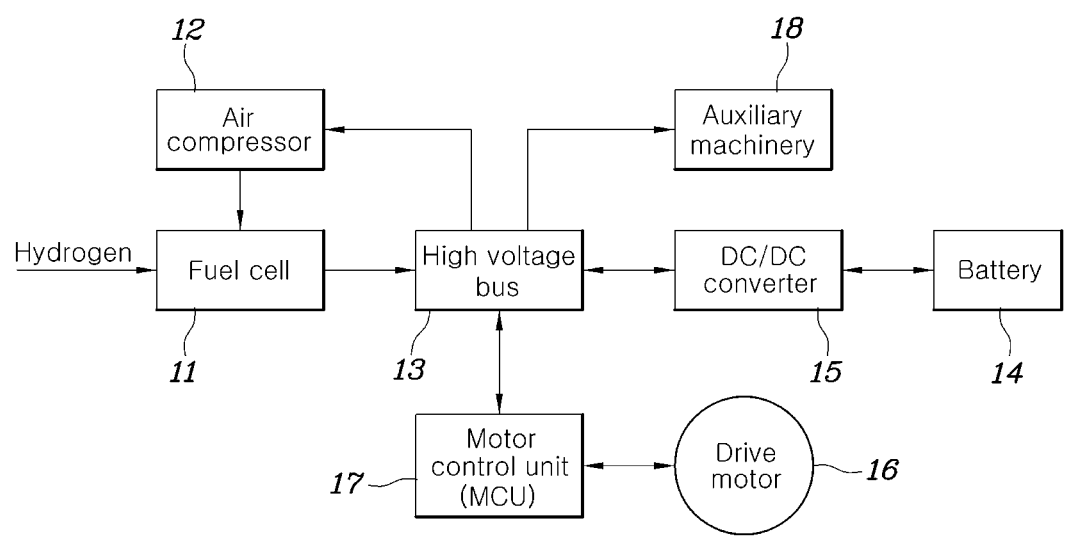
FIG. 1 is a block diagram schematically illustrating a power network system in a fuel cell vehicle that is applicable to an apparatus and method for power demand distribution in a fuel cell vehicle according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, apparatuses and methods of power demand distribution in a fuel cell vehicle according to various embodiments will be described more in detail with reference to accompanying drawings. Throughout the drawings, the same reference numerals will refer to the same or like parts.

FIG. 1 is a block diagram schematically illustrating a power network system in a fuel cell vehicle. According to embodiments of the present disclosure, an apparatus and method for power demand distribution in a fuel cell vehicle are applied to the power network system of FIG. 1.

Referring to FIG. 1, the power network system may be configured to include: a fuel cell 11; a high voltage bus 13 connected to a power output terminal of the fuel cell 11; a battery 14 connected to the high voltage bus 13 by interposing an DC/DC converter 15; a motor control unit 17 supplying the converted voltage to a drive motor 16 by converting a voltage of the high voltage bus 13; an air compressor 12 operated by power supplied from the high voltage bus 13 and feeding compressed air to the fuel cell 11; and a high voltage auxiliary machinery 18 operated by receiving the power of a high voltage bus terminal.

In the power network system as illustrated in FIG. 1, the drive motor 16, the air compressor 12, and the auxiliary machinery 18 are components that are configured to consume power received from the high voltage bus 13, and the fuel cell 11 and the battery 14 are components that are configured to supply power to the high voltage bus 13.

The power supplied from the battery 14 can be controlled through control of voltage/current of the DC/DC converter 15. In the case of the battery 14 as an energy storage device, power supply is immediately available when a vehicle demands power.

However, in the case of the fuel cell 11, an amount of hydrogen and air feed corresponding to an amount of the power supply should be input into the fuel cell in order to normally supply the power corresponding to the power required by the vehicle. In the case of a hydrogen feed, control can be implemented at a desired pressure within a relatively short time through pressure control, but in the case of air, a response delay of a certain amount of time is inevitable because an air feed amount corresponding to a desired amount of air flow should be established through an operation of the air compressor 12.

When the air compressor 12 is in a stopped state or in an operating state with a very low revolution speed (minimum revolution speed), in order not to cause the response delay as described above, various embodiments of the present disclosure may provide a power demand distribution technique to secure in advance power output from the fuel cell 11.

Figure 2:
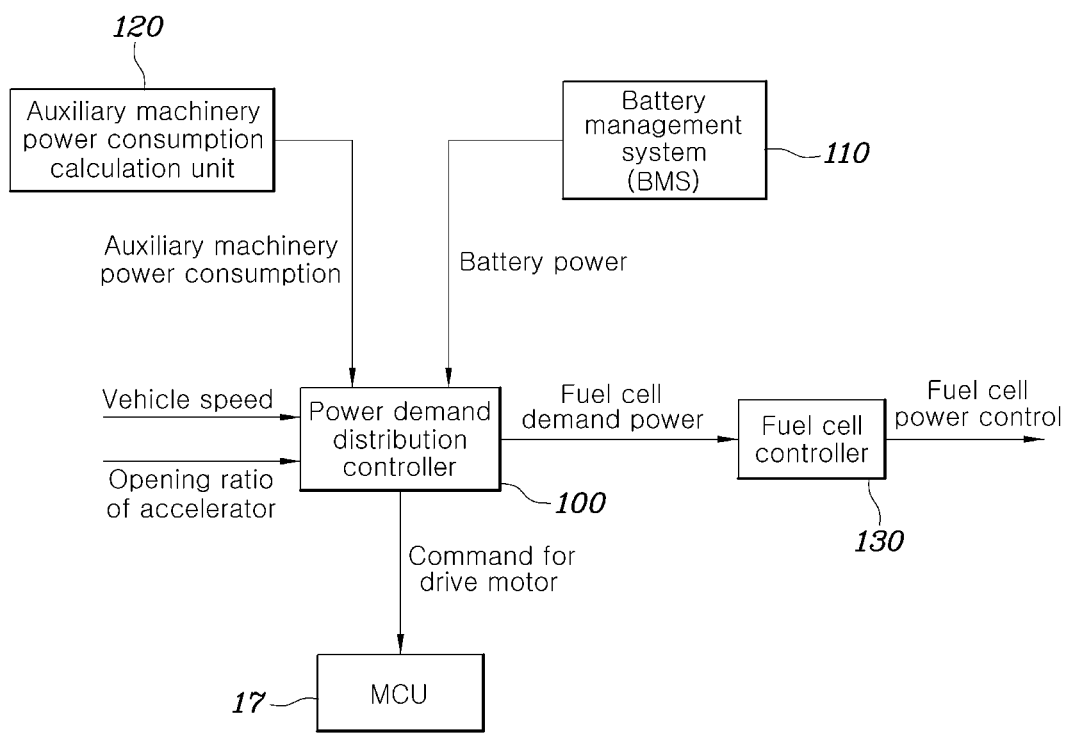
FIG. 2 is a block diagram illustrating an apparatus for power demand distribution in a fuel cell vehicle according to an embodiment of the present disclosure.

FIG. 2 is a block diagram illustrating an apparatus for power demand distribution in a fuel cell vehicle according to an embodiment of the present disclosure.

Referring to FIG. 2, the apparatus for the power demand distribution in a fuel cell vehicle according to an embodiment of the present disclosure may be equipped with the drive motor 16 operated by power supplied from each of the fuel cell and the battery, and includes: a battery management system 110 calculating an allowable battery power that is power the battery 14 can supply; a power demand distribution controller 100 configured to derive the vehicle demand power including the motor demand power required by the drive motor 16, and determining a value obtained by subtracting the allowable battery power being scaled down from the vehicle demand power or a value corresponding to the drive motor demand power, as the fuel cell demand output; and a fuel cell controller 130 configured to drive the air compressor feeding the air to the fuel cell to enable the fuel cell to generate the fuel cell demand output calculated in the power demand distribution controller 100.

In the system configured as described above, the battery management system 110 corresponds to a typical battery management system (BMS) that manages an overall battery status included in an environmentally-friendly vehicle. As provided herein, the battery management system 110 can receive and calculate various information related to management of the battery 14 storing electric energy that can be supplied to the drive motor or high voltage auxiliary machinery. The battery management system 110 can transfer the allowable battery power, which is the power the battery 14 can supply, to the power demand distribution controller 100 when a driving of the fuel cell vehicle is initiated or an increase of the torque of the drive motor 16 is necessary during driving of the fuel cell vehicle.

In addition, the fuel cell controller 130, as an element controlling the overall fuel cell system, controls output power of the fuel cell by controlling a feed rate of oxygen that is a fuel fed to the fuel cell and a feed rate of air fed as an oxidizing agent and also serves as an element managing various parameters for the management of the fuel cell. The fuel cell controller 130 in the present disclosure receives the fuel cell demand power calculated from the power demand distribution controller 100 and, regarding the fuel cell demand power as a value of the command, can control the feed rate of hydrogen and oxygen fed to the fuel cell to produce the power corresponding to the value of the command.

The power demand distribution controller 100 may derive the vehicle demand power including the drive motor demand power required by the drive motor, the fuel cell demand power obtained by subtracting the allowable battery power from the vehicle demand power, or the drive motor demand power itself as the fuel cell demand power.

Figure 3:
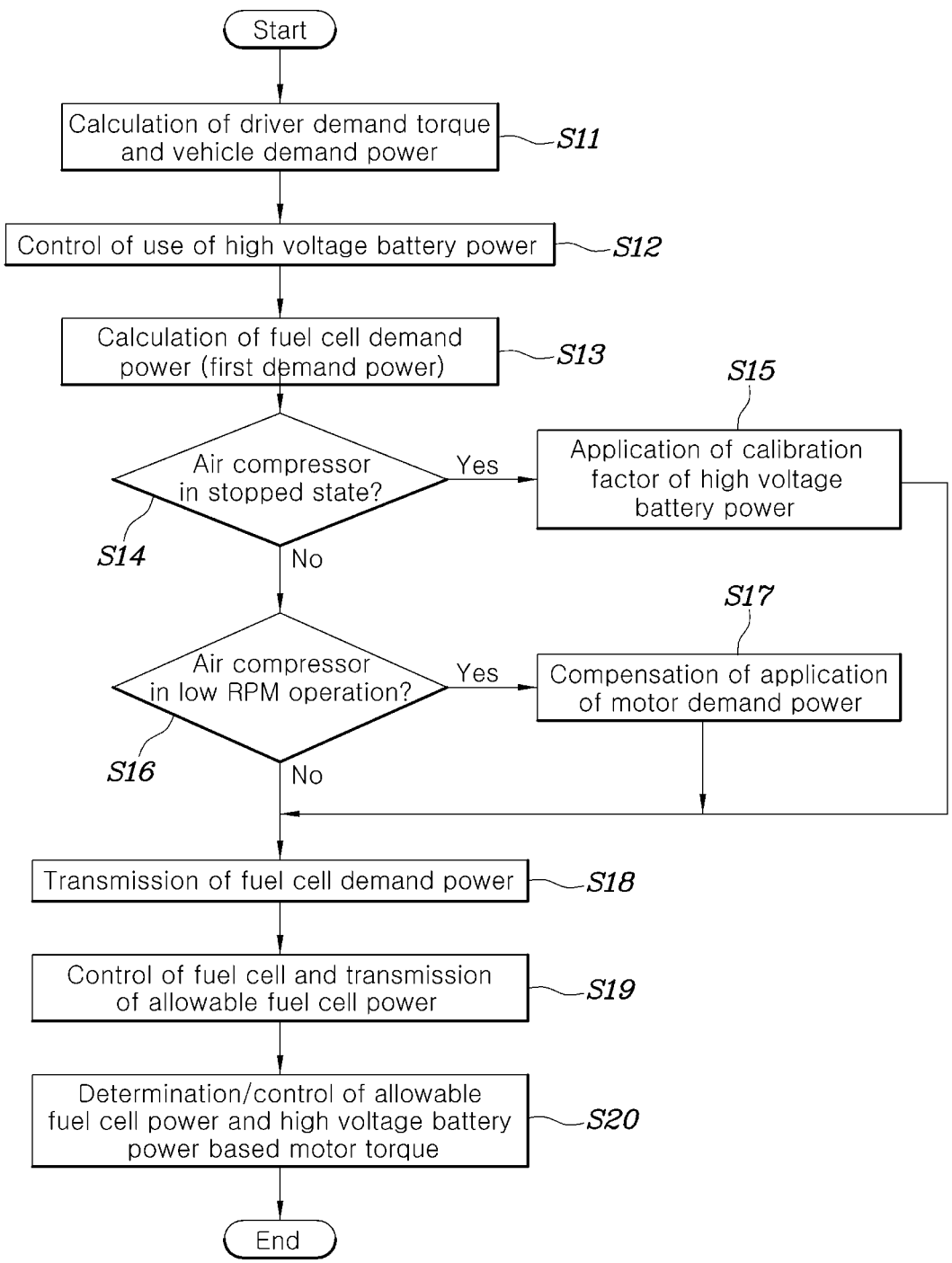
FIG. 3 is a flowchart illustrating a method of power demand distribution in a fuel cell vehicle according to an embodiment of the present disclosure.

A detailed description of the power demand distribution controller 100 will be apparent through a description of a method of power demand distribution in a fuel cell vehicle according to an embodiment of the present disclosure illustrated in FIG. 3.

In an embodiment of the present disclosure, the apparatus may further include an auxiliary machinery power consumption calculation unit 120 calculating power consumed by the auxiliary machinery 18 supplied with power from the fuel cell 11 or the battery 14, and the power demand distribution controller 100 can calculate the vehicle demand power by adding the drive motor demand power and the power consumed by the auxiliary machinery.

FIG. 3 is a flowchart illustrating a method of power demand distribution in a fuel cell vehicle according to an embodiment of the present disclosure.

As illustrated in FIG. 3, a method of power demand distribution in a fuel cell vehicle according to an embodiment of the present disclosure may be configured to include: step S11 deriving the drive motor demand power required by the drive motor 16 on the basis of a vehicle speed and an opening ratio of the vehicle accelerator; step S12 receiving the allowable battery power that the battery 14 can supply; steps S14 and S16 confirming an operating status of the air compressor 12 supplying the air to the fuel cell 11; steps S15 and S17 determining a value obtained by subtracting the allowable battery power being scaled down from the vehicle demand power including the drive motor demand power or a value corresponding to the drive motor demand power, as the fuel cell demand output.

The method of power demand distribution in a fuel cell vehicle according to an embodiment of the present disclosure may begin at step S11 calculating a demand torque of the drive motor on the basis of the opening ratio of the accelerator corresponding to a driver demand torque obtained from the driver of the fuel cell vehicle to step on the accelerator for driving of the vehicle and current vehicle speed, and deriving a drive motor demand power corresponding to the demand torque. At step S11, the power demand distribution controller 100 receives information on the current vehicle speed and the opening ratio of the accelerator by the driver, derives a torque demand of the drive motor corresponding to the information on the speed and the opening ratio (typically calculated by an operation expression or use of a data map), and derives the demand power of the drive motor 16 corresponding to the demand torque.

Subsequently, the power demand distribution controller 100 receives from the battery management system 110 the allowable battery power that is the available power to be supplied from the battery (S12). At step S12, the power demand distribution controller 100 also receives the auxiliary machinery power consumption from the auxiliary machinery power consumption calculation unit 120, and can derive the vehicle demand power by adding the drive motor demand power and the power consumed by the auxiliary machinery.

Subsequently, the power demand distribution controller 100 can preferentially calculate the fuel cell demand power simply by subtracting the allowable battery power from the vehicle demand power (S13). A technique calculating the fuel cell demand power by using a value obtained by simply subtracting the allowable battery power from the vehicle demand power is a conventional application technique.

Figure 4:
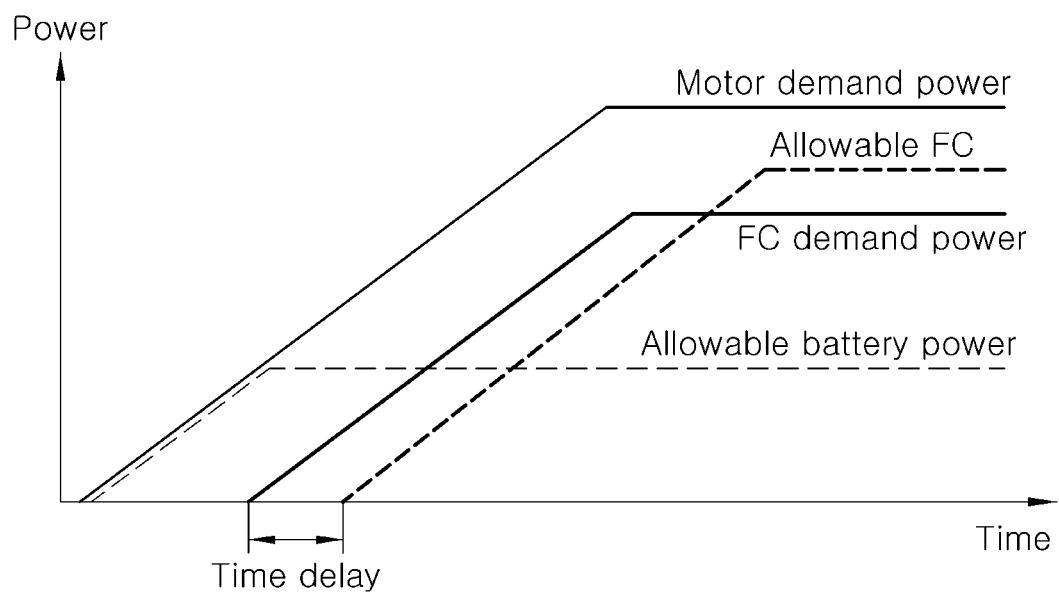
FIG. 4 is a graph showing a response delay according to a method of power demand distribution in a conventional fuel cell vehicle.

FIG. 4 is a graph describing a response delay according to a method of power demand distribution in a conventional fuel cell vehicle.

When the fuel cell demand power calculated simply by subtracting the allowable battery power from the vehicle demand power is applied, the allowable battery power is applied during a time period that the motor demand power (or vehicle demand power) is gradually increasing, and then when the motor demand power becomes greater than the allowable battery power, fuel cell demand power is required, as illustrated in FIG. 4. As described above, since the fuel cell is required to wait some time for operation of the air compressor, the fuel cell cannot be immediately brought into a state that the fuel cell outputs the demand power due to the necessity of feeding air into the fuel cell. Consequently, the allowable fuel cell power that the fuel cell can supply is generated after a delay of a certain amount of time.

Various embodiments of the present disclosure may apply two techniques to prevent the time delay.

As one of the two techniques, when the power demand distribution controller 100 determines the air compressor 12 is in a stopped state (S14), a method calculating the fuel cell demand power by applying a scaling factor α to the allowable battery power (S15) is used. That is, in the calculation applied in step S13, the fuel cell demand power may be calculated by applying the scaling factor α to the allowable battery power without subtracting the allowable battery power itself from the vehicle demand power (S15).

Figure 5:
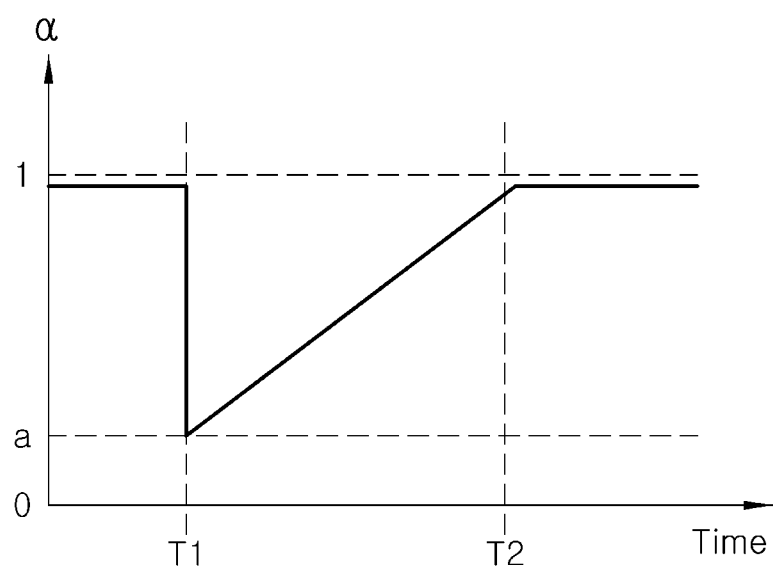
FIG. 5 is a graph showing an example of a scaling factor applied in a method of power demand distribution in a fuel cell vehicle according to an embodiment of the present disclosure.

FIG. 5 is a graph describing an example of a scaling factor applied in a method of power demand distribution in a fuel cell vehicle according to an embodiment of the present disclosure.

The scaling factor α applied at step S15 has a value no greater than 1 as illustrated in FIG. 5, and can scale down the allowable battery power with a form that is gradually increasing as time passes from the time the a is applied first. When such a scaling factor α is applied, the actual allowable battery power does not change, but the magnitude of the allowable battery power used in calculating the fuel cell demand power decreases, thereby increasing the fuel cell demand power.

Figure 6:
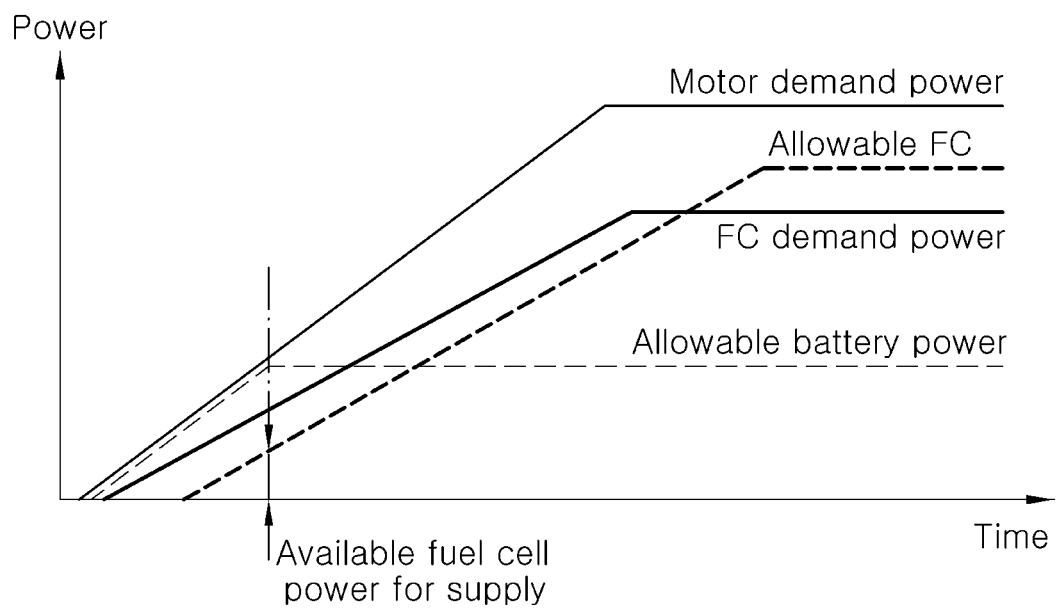
FIGS. 6 and 7 are graphs showing removal of a response delay by several power demand distribution techniques applied in an apparatus and method of power demand distribution in a fuel cell vehicle according to embodiments of the present disclosure.

FIG. 6 is a graph describing removal of a response delay by several power demand distribution techniques applied in an apparatus and method of power demand distribution in a fuel cell vehicle according to several embodiments of the present disclosure and, particularly, describes removal of a response delay by the control at step S15.

Figure 7:
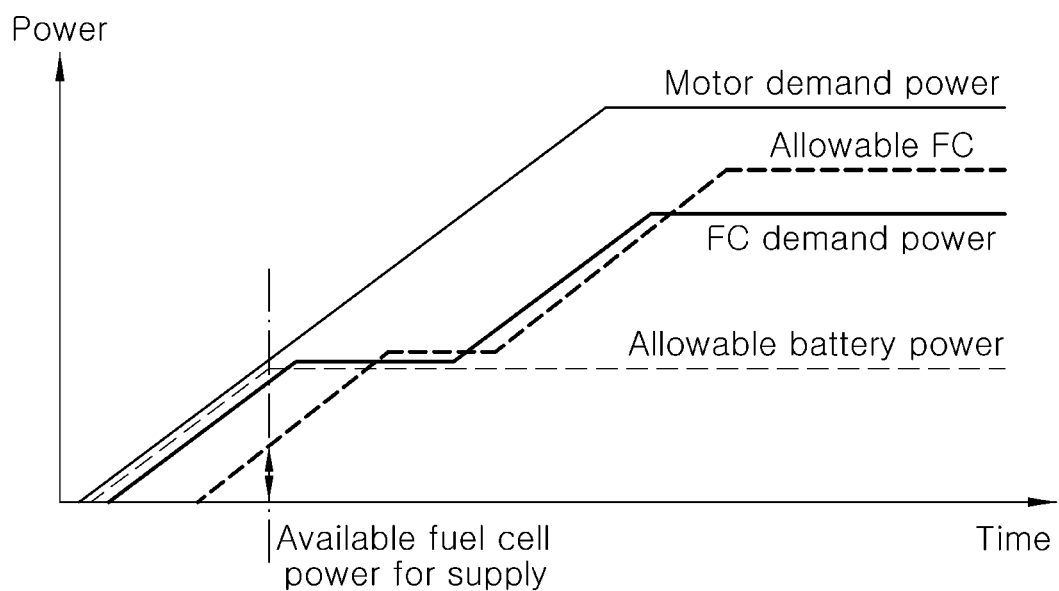

Referring to FIGS. 6 and 7, at the time the control starts T1, as the power demand distribution controller 100 transmits to the fuel cell controller 130 the fuel cell demand power greater than the demand calculated by applying the actual allowable battery power, the fuel cell controller 130 controls the air compressor 12 to produce the power corresponding to the fuel cell demand power. Accordingly, the air compressor 12 starts in advance and, as the air compressor 12 is already in an operating state when the fuel cell demand power is calculated by applying the actual allowable battery power at the time the scaling factor α becomes 1 T2, it is possible to remove the time delay that is taken for the fuel cell to produce the power corresponding to the demand power.

Another technique of the present disclosure configured to remove the time delay of the fuel cell output due to the operation of the air compressor is the technique that applies the drive motor demand power itself as the fuel cell demand power without subtracting the allowable battery power from vehicle demand power at the early stage of the control.

FIG. 7 is a graph describing removal of a response delay by several power demand distribution techniques applied in an apparatus and method of power demand distribution in a fuel cell vehicle according to several embodiments of the present disclosure, and describes a control technique corresponding to step S17.

Referring to FIG. 7, when the air compressor 12 is confirmed being in a low speed operating state with a speed lower than a predetermined reference revolution speed at confirming step S16, this technique determines a greater value between a value obtained by subtracting the allowable battery power from both the drive motor demand power and the vehicle demand power (that is the value calculated at step S13) and a value of the drive motor demand power, as the fuel cell demand.

According to such technique, as the drive motor demand power can be supplied by the fuel cell demand power, regardless of the actual allowable battery power, without imposing demand on the battery at all, the power demand distribution controller 100 can be controlled to produce the power required to drive the drive motor. That is, in a state that the drive motor demand power is supplied by an allowable current of the battery in reality, the fuel cell controller 130 can operate the air compressor 12 in advance by calculation to output the power corresponding to the drive motor demand power. That is, the fuel cell controller 130 operates the air compressor 12 at the time the drive motor demand power occurs, and even though the fuel cell demand power occurs after a delay of a certain amount of time, the drive motor demand power is fulfilled by the allowable battery power in an interval during which the delay exists, and from the time the allowable battery power reaches the limit thereof, the drive motor demand power is supplied with the allowable fuel cell power produced by the air compressor 12 that is already in operation.

In this manner, the power demand distribution controller 100 requests the fuel cell controller 130 for the fuel cell demand power being appropriately processed (S18), the fuel cell controller 130 controls a fuel cell system to output the power corresponding to the fuel cell demand power and delivers the allowable fuel cell power that can be actually output from the fuel cell to the power demand distribution controller 100 (S19), and the power demand distribution controller 100 determines the final torque of the drive motor on the basis of the allowable battery power and the allowable fuel cell power, and enables the power to be supplied to output the torque.

Figure 8:
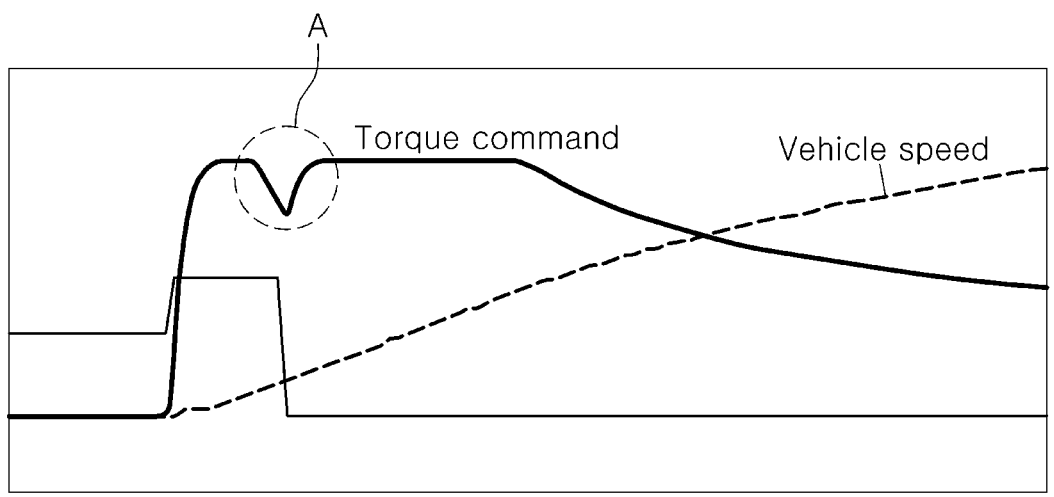
FIGS. 8 and 9 are graphs showing a difference of drive torque command of a drive motor when a conventional power demand distribution technique and a power demand distribution technique according to an embodiment of the present disclosure are applied.
Figure 9:
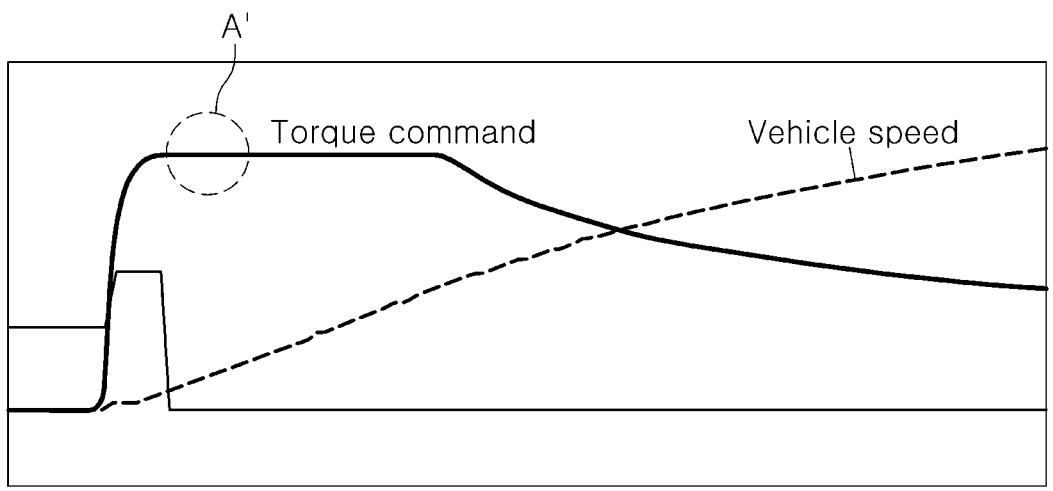

FIGS. 8 and 9 are graphs describing a difference of drive torque command of the drive motor when a conventional power demand distribution technique and a power demand distribution technique according to an embodiment of the present disclosure are applied.

In the related art, as the output of the fuel cell is delayed, the allowable fuel cell power that the fuel cell controller 130 supplies to the power demand distribution controller 100, decreases in an interval during which the output of the fuel cell is delayed. Therefore, as illustrated in FIG. 8, a problem occurs in that the torque command of the drive motor decreases (region A of FIG. 8) in the interval during which the output of the fuel cell is delayed, wherein the torque command is produced by the power demand distribution controller 100 by taking into consideration of the allowable battery power and the allowable fuel cell power.

However, according to the various embodiments of the present disclosure, the interval during which the allowable fuel cell power is decreased can be removed. Accordingly, as illustrated in FIG. 9, the interval that the allowable fuel cell power is decreased does not occur, and a constant torque command can be produced. Consequentially, the present disclosure can realize the drive motor torque corresponding to a driver demand torque, thereby preventing degradation in the dynamic performance of the fuel cell vehicle.

Although preferred embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. An apparatus for power demand distribution in a fuel cell vehicle having a fuel cell, a battery, and a drive motor operating by power supplied from the fuel cell and the battery, the apparatus comprising:
   a battery management system calculating an allowable battery power that the battery can supply;
   a power demand distribution controller configured to derive a vehicle demand power including a drive motor demand power required by the drive motor, and determine a value obtained by subtracting the allowable battery power being scaled down from the vehicle demand power or a value corresponding to the drive motor demand power, as a fuel cell demand output; and
   a fuel cell controller configured to drive an air compressor feeding air to the fuel cell to enable the fuel cell to generate the fuel cell demand output calculated by the power demand distribution controller,
   wherein the power demand distribution controller scales down the allowable battery power by multiplying a scaling factor gradually increasing as time passes by the allowable battery power.

2. The apparatus of claim 1, wherein, when the air compressor is in a stopped state, the power demand distribution controller determines the value obtained by subtracting the allowable battery power being scaled down from the vehicle demand power, as the fuel cell demand output.

3. The apparatus of claim 1, wherein, when the air compressor is not in a stopped state, but in a low speed operating state with a speed lower than a predetermined reference revolution speed, the power demand distribution controller determines the value corresponding to the drive motor demand power, as the fuel cell demand output.

4. The apparatus of claim 3, wherein, when the air compressor is not in the stopped state, but in the low speed operating state with the speed lower than the predetermined reference revolution speed, the power demand distribution controller determines a greater value between a value obtained by subtracting the allowable battery power from both the drive motor demand power and the vehicle demand power and the value corresponding to the drive motor demand power, as the fuel cell demand output.

5. The apparatus of claim 1, wherein, when the air compressor is not in a stopped state, but in a low speed operating state with a speed lower than a predetermined reference revolution speed, the power demand distribution controller determines a greater value between a value obtained by subtracting the allowable battery power from both the drive motor demand power and the vehicle demand power and the value corresponding to the drive motor demand power, as the fuel cell demand output.

6. The apparatus of claim 1, further comprising an auxiliary machinery power consumption calculator calculating power consumed by an auxiliary machinery being supplied with power from the fuel cell or the battery, wherein the power demand distribution controller calculates the vehicle demand power by adding the drive motor demand power and the power consumed by the auxiliary machinery.

7. A method of power demand distribution in a fuel cell vehicle having a fuel cell, a battery, and a drive motor operating by power supplied from the fuel cell and the battery, the method comprising:
   deriving drive motor demand power required by the drive motor on the basis of a vehicle speed and an opening ratio of a vehicle accelerator;
   receiving allowable battery power that the battery can supply;
   confirming an operating status of an air compressor feeding air to the fuel cell; and
   determining, on the basis of the operating status of the air compressor, a value obtained by subtracting the allowable battery power being scaled down from the vehicle demand power including the drive motor demand power or a value corresponding to the drive motor demand power, as a fuel cell demand output,
   wherein, when the air compressor is confirmed being in the stopped state at the confirming the operating status of the air compressor, the allowable battery power is scaled down by multiplying a scaling factor gradually increasing as time passes by the allowable battery power at the determining the fuel cell demand output.

8. The method of claim 7, wherein at the confirming the operating status of the air compressor, it is determined whether the air compressor is in a stopped state, and then when the air compressor is not in the stopped state, it is determined whether the air compressor is in a low speed operating state with a speed lower than a predetermined reference revolution speed.

9. The method of claim 8, wherein, when the air compressor is confirmed being in the stopped state at the confirming the operating status of the air compressor, the value obtained by subtracting the allowable battery power being scaled down from the vehicle demand power including the drive motor demand power is determined as the fuel cell demand output at the determining the fuel cell demand output.

10. The method of claim 8, wherein, when the air compressor is confirmed being in the low speed operating state with the speed lower than the predetermined reference revolution speed at the confirming the operating status of the air compressor, the value corresponding to the drive motor demand power is determined as the fuel cell demand output at the determining the fuel cell demand output.

11. The method of claim 10, wherein, when the air compressor is confirmed being in the low speed operating state with the speed lower than the predetermined reference revolution speed at the confirming the operating status of the air compressor, a greater value between a value obtained by subtracting the allowable battery power from both the drive motor demand power and the vehicle demand power and the value o-corresponding to the drive motor demand power is determined as the fuel cell demand output at the determining the fuel cell demand output.

12. The method of claim 7, further comprising:
   driving the fuel cell by feeding hydrogen and air to the fuel cell on the basis of the fuel cell demand output, subsequent to the determining the fuel cell demand output;
   deriving an allowable fuel cell power that can be output from the fuel cell, subsequent to the driving the fuel cell; and
   deriving an allowable drive motor power that can be provided to the drive motor on the basis of the allowable battery power and the allowable fuel cell power, and determining a final driving torque of the drive motor on the basis of the allowable drive motor power.

* * * * *